UNITED STATES PATENT OFFICE 2,341,210

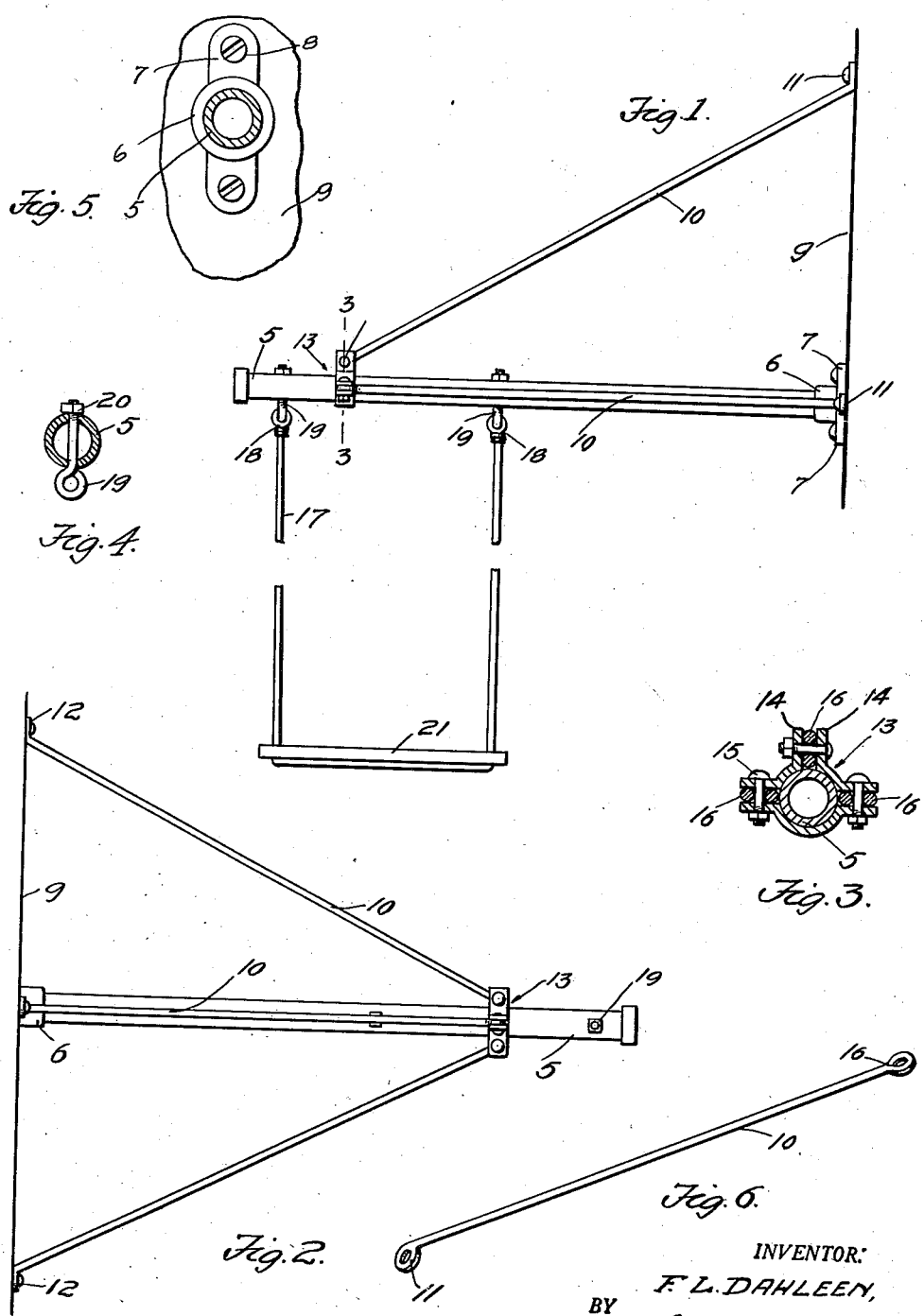

HANGER BRACKET FOR SWINGS

Francis L. Dahleen, Los Angeles, Calif.

Application August 2, 1943, Serial No. 497,049

2 Claims. (Cl. 155—58)

This invention relates broadly to swings, such as are commonly known in the art as rope swings, consisting of a suitable length of rope adapted to be suspended from a suitable support for use by children and the like as a swing; and more particularly the invention has reference to a hanger for suspending such swing for use.

In accordance with the present invention a hanger bracket for such swings is provided so as to be readily mounted on any suitable support, such as the side of a house, or the like, for use in effectively suspending a swing therefrom.

The invention, together with its objects and advantages, will be best understood from a study of the following description taken in connection with the accompanying drawings, wherein:

Fig. 1 is a side elevational view illustrating the application of the invention;

Fig. 2 is a top plan view thereof;

Fig. 3 is a detail sectional view taken substantially on line 3—3 of Fig. 1;

Fig. 4 is a sectional view through the suspension arm of the bracket;

Fig. 5 is a view showing the suspension arm in section and a supporting socket for the arm in elevation; and Fig. 6 is a perspective view of a brace rod.

Referring more in detail to the drawing, it will be seen that in the preferred embodiment thereof, the rope swing and bracket therefor comprises a tubular arm 5, of any suitable material, that at one end fits snugly within a socket 6, equipped with apertured attaching ears 7, through the medium of which, and screws or other fastening elements 8, said socket is secured to a suitable support 9, as for example the wall of a house or the like.

Also for the suspension arm 5 there are provided, in the present instance, three braces 10 arranged as shown.

At one end thereof, each brace 10 is provided with an angular integral eye 11, through the medium of which, and a screw or other fastening element 12, said brace at said end is secured at the desired position on the wall or other supporting structure 9. Preferably, one of the braces 10 has its end 11 secured to the supporting structure 9 directly above and in vertical alignment with the socket 6, while the two remaining braces 10 are disposed at opposite sides of the socket 6 and have their ends 11 secured to the supporting structure and in the horizontal plane of the socket 6.

For securing the braces 10 to the suspension rod 5, there is provided a collar 13.

As best shown in Fig. 3, the collar 13 comprises three complementary parts, each provided at the ends thereof with ears 14, through the medium of which, and bolts 15, said collar is secured at the desired position on the suspension bar 5.

The brace-rods 10 are provided at the ends 16 thereof with integral apertured eyes that fit between pairs of ears 14 and accommodate the bolts 15, as clearly shown in Fig. 3, whereby said brace rods are secured through the medium of the collar to the suspension bar 5 and thus serve to effectively brace said suspension bar.

The swing shown in Fig. 1 is of conventional construction, embodying as it does a rope 17 of suitable length, the ends of which are suitably formed to provide eyes 18 that engage eye-bolts 19, through the medium of which the swing is suspended from the rod 5.

As shown in Fig. 4, the rod is suitably apertured to accommodate the bolts 19, which latter are equipped with fastening nuts 20.

Completing the swing is a seat 21, of wood or other suitable material.

It will thus be seen that my bracket can be cheaply constructed, readily set up for use, and when in use will serve admirably for suspending a rope swing from the side of a house, a wall, or other suitable structure, providing for the swing a suspension means that is more safe and secure than the limb of a tree or the like, now generally resorted to for such purpose.

I claim:

1. A suspension bracket for a rope swing, said bracket comprising a suspension rod provided at one end thereof for attachment to a wall or similar support so as to extend in a horizontal plane from said support, brace-rods for said suspension rod, said brace-rods being provided at one end for the securing thereof to the support for the suspension rod, a multi-part collar embracing said suspension rod, the parts of said collar being provided with apertured ears, bolts engaging said ears for connecting said parts together and for securing the collar in clamped position on said suspension rod, and said brace-rods having apertured ends engaged by said bolts and secured thereby between the ears of said clamp parts.

2. In a swing of the class described, a socket provided with apertured attaching flanges and adapted to be mounted on a wall or analogous support, a suspension rod having an end thereof fitting snugly within said socket, spaced eye-bolts having shank portions thereof extending transversely through said suspension rod and equipped with nuts securing said eye-bolts on said suspension rod, a swing-rope having the ends thereof secured to said eye-bolts, braces for said suspension rod, said braces being equipped at one end thereof for attachment to the aforenamed support, and a multi-part clamp engaging the free end of said brace-rods and embracing said suspension rod and serving positively to connect said brace-rods with said suspension rod.

FRANCIS L. DAHLEEN.